United States Patent [19]

Rourke

[11] 4,031,183

[45] June 21, 1977

[54] PROCESS FOR CALCINING LIMESTONE

[76] Inventor: Terence Arthur Rourke, Upper Long Beach Road, R.R. 3, Nelson, B.C., Canada, V1P 5P6

[22] Filed: Feb. 17, 1976

[21] Appl. No.: 658,576

Related U.S. Application Data

[63] Continuation-in-part of Ser. No. 559,193, March 17, 1973, abandoned.

[52] U.S. Cl. .............................. 423/175; 423/637; 432/25; 432/96
[51] Int. Cl.² ...................................... C01F 11/06
[58] Field of Search ............... 432/17, 25, 51, 95, 432/96; 423/175, 176, 177, 637

[56] References Cited

UNITED STATES PATENTS

| | | | |
|---|---|---|---|
| 1,243,311 | 10/1917 | Loder | 432/96 |
| 3,584,849 | 6/1971 | Cremer et al. | 432/25 |
| 3,645,514 | 2/1972 | Lado | 432/17 |
| 3,887,326 | 6/1975 | Townley | 432/25 |

Primary Examiner—O. R. Vertiz
Assistant Examiner—Wayne A. Lange
Attorney, Agent, or Firm—Richard J. Hicks

[57] ABSTRACT

A process and apparatus for burning limestone to produce calcined lime in which limestone is burned continuously in a vertical kiln provided with a plurality of fuel injectors which permit pulsed introduction of fuel so as to ensure a lamellar flow of fuel through the kiln and a controlled release of heat.

3 Claims, 6 Drawing Figures

PROCESS FOR CALCINING LIMESTONE

This application is a continuation-in-part of my earlier filed U.S. application 559,193 filed Mar. 17, 1973 and now abandoned.

This invention relates to a process and apparatus for calcining limestone. More particularly the invention relates to a novel vertical kiln for calcining limestone and a process of operation thereof.

Limestone is a general term embracing carbonate rocks or fossils and is primarily calcium carbonate or a combination of calcium and magnesium carbonate with varying amounts of impurities such as silica and alumina. In contrast, lime is invariably derived from limestone and is a calcined or burned form of limestone, usually known as quicklime or hydrated lime. During calcination of limestone water and carbon dioxide are expelled forming calcium oxide (quicklime) and when water is added thereto calcium hydroxide (hydrated or slaked lime) is produced. While limestone, quicklime and hydrated lime have some similarities in character, properties and uses, it is emphasized that this invention is primarily concerned with quicklime and a novel process and apparatus for producing it.

Quicklime has been known for many centuries and vast quantities are consumed annually throughout the world in a wide range of uses as diverse as metallurgical flux and as an absorbent. The uses of lime are second only to sulphuric acid as an industrial chemical.

As varied as the uses of lime are the processes and apparatus which have been developed for producing it, from Ancient Egyptian times to the present. The processes range from burning heaps of limestone to use of intermittent and continuous vertical kilns; horizontal rotary kilns; flu-solids kilns; and circular refractory hearths; many of which have been adapted for operation with fuels as diverse as wood, oil, coal, coke or natural gas depending upon local costs and availability, the object always being to obtain the maximum output of lime for a given input of heat, while recognizing that the heat supplied must be uniformly distributed and excessively high flame temperatures avoided. Most modern processes can be divided into three stages, namely, preheating, calcination and cooling. Waste heat from the cooling stage is, of course, used in the air preheat stage and fuel is normally only supplied in the calcination stage. It has been determined theoretically that the minimum heat requirement to convert 100% pure calcium carbonate to lime is 2.77 million BTU/ton plus 1.6 million BTU/ton to heat the stone to the dissociation temperature (1648° F [898° C]). By convention, however, the preheating figure is not included as a portion of the heat requirement as, theoretically, it occurs only once on warming the first charge of limestone, from then on the BTU recovery from the gases leaving the calcining stage serves predominantly to preheat successive charges. Naturally, 100% efficiency is unattainable, due largely to three reasons. Firstly, there is no commercial limestone available at 100% purity; secondary, it is impossible to calcine lime without some dissipation of heat calories; and thirdly, production of lime with zero core of unburned stone and recarbonation, without hard burning, is virtually impossible. Over the years the heat requirements of the various types of kilns have been steadily reduced so that today rotary kilns of modern design reqire 5.5–10 million BTU/ton, vertical kilns of the Asbe type 5–7 million BTU/ton, double incline vertical kilns about 4.1 million BTU/ton and rotary hearth kilns of the Calcimatic type 5.1–5.5 million BTU/ton, Schmid-Hoffer regenerative kilns 3.2 million BTU/ton and mixed feed kilns 3–5 million BTU/ton.

An object of the present invention is to provide a vertical kiln for calcining limestone with a lower heat requirement than heretofore believed possible.

Another object of the present invention is to provide a process for producing calcined lime in a vertical kiln of novel design so as to use only an amount of heat approaching the theoretical minimum.

Thus, by one aspect of the invention there is provided a process for the continuous production of calcined lime from limestone in a vertical kiln in which fuel is supplied through a plurality of injectors circumferentially spaced around the kiln in a single horizontal plane spaced from the lower end of the kiln and combustion air is supplied to said kiln, from a level below said injectors, counter current to the flow of limestone, comprising:

a. charging limestone ranging in size up to about five inches to the top of said kiln for downward movement therethrough;

b. continuously blowing air upwardly through said kiln in an amount sufficient to support combustion;

c. injecting fuel at a relatively high pressure through each of said injectors in a predetermined sequence at a rate between 100 and 500 injections per injector per minute, each of said injections occurring in a time period between 0.02 and 0.2 seconds thereby establishing an initial lamellar flow of fuel and air in said kiln; and d. withdrawing calcined lime at the lower end of said kiln.

By another important aspect of the invention there is provided an apparatus for the production of calcined lime comprising: a refractory line vertical shaft provided with material feed means and gas exhaust means; cooler means secured to and in communication with the lower end of said vertical shaft and provided with means to withdraw calcined lime from said apparatus; means for admitting air into said cooler; a draw feeder plate mounted between said cooler and said shaft so as to provide a baffle means therebetween; a draw feeder means mounted through said lower end of said shaft and adapted to draw material on said feeder plate into said cooler; a plurality of injector means spaced around said shaft in a horizontal plane spaced from said lower end thereof for introducing fuel into said shaft; and means for supplying fuel at relatively high pressure to each of said injector means at a rate between 100 and 500 injections per minute.

The invention will be described in more detail hereinbelow with reference to the accompanying drawings in which.

Figure 1:
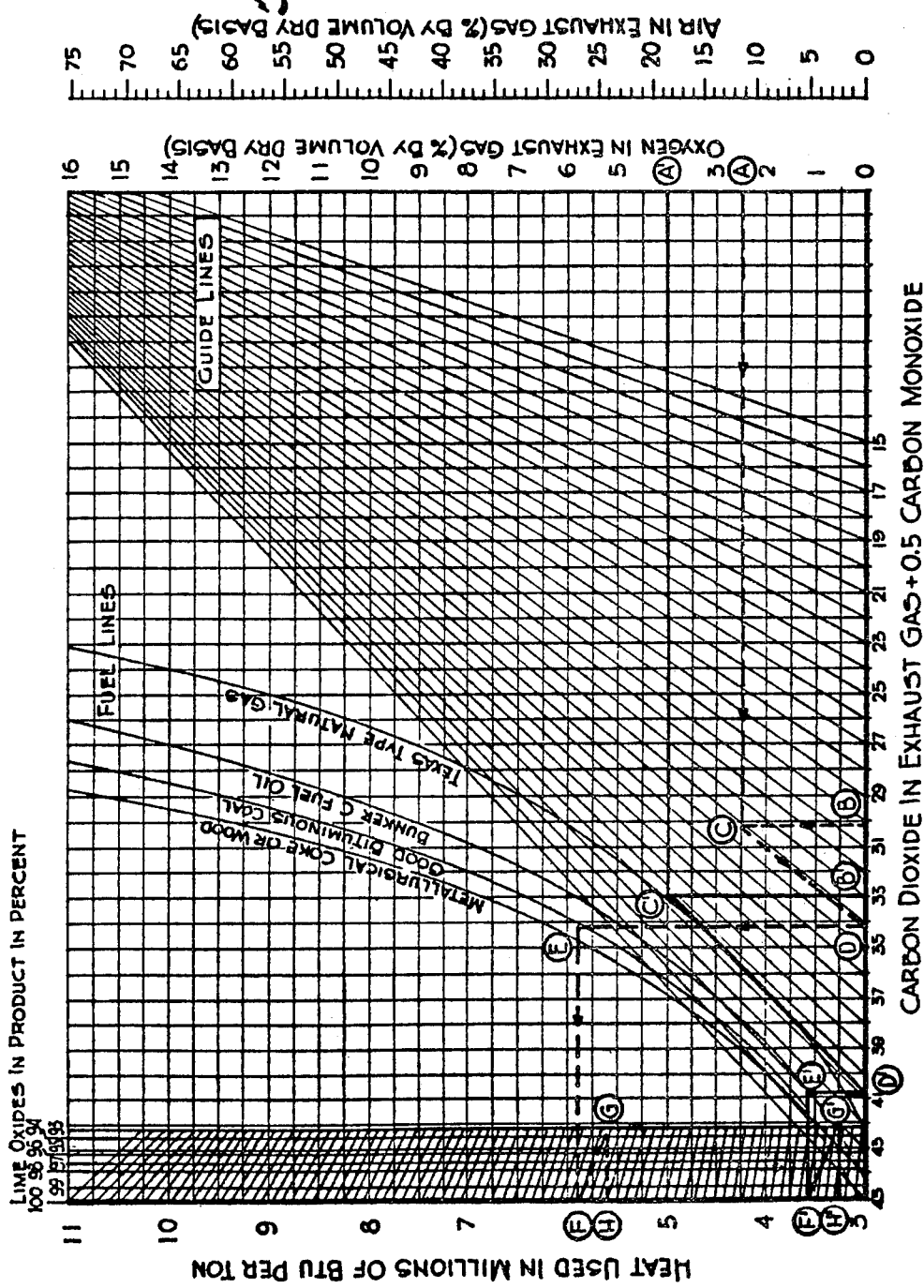
FIG. 1 is a graph for calculation of kiln thermal efficiency from waste gas analysis (from Azbe, Rotary Kiln Evaluation and Development, Rock Prod. Mar. 1954).
Figure 2:
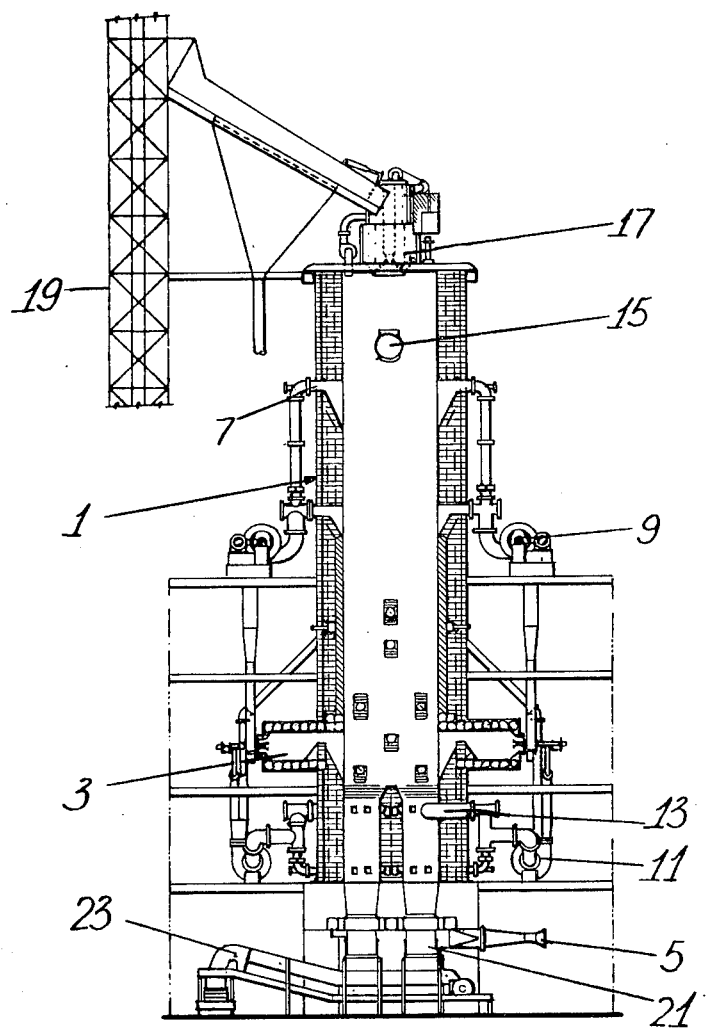
FIG. 2 is a schematic view of an Azbe high capacity vertical kiln, representative of the prior art.

Turning firstly to FIG. 1, which illustrates thermal efficiency of a kiln from waste gas analysis, and which is described in detail in Boynton "Chemistry and Technology of Lime and Limestone," John Wiley and Sons, Inc., 1966, let us assume that high calcium quicklime is burned with high grade coal in an Azbe type kiln of the type depicted in FIG. 2, and that the exhaust gases contain 2.5% $O_2$, shown at A, and 30.1% $CO_2$, shown at B. A horizontal line is drawn from A which intersects the vertical line from B at C. To allow for the 2.5% $O_2$, the "equivalent $CO_2$" is obtained by drawing a line which is drawn diagonally down to D at 34.2% in parallel with the guide lines. Next, a vertical line is extended up to E, where it intersects the gradient representing coal fuel. Adjusting for different fuels, observe the other fuel gradients for coke, oil and natural gas, which compensate for their different thermal values. Then a horizontal line is extended to the left ordinate at F, indicating a fuel consumption of 5.8 million BTU/ton. Assuming a CaO content of 95%, then a diagonal line is drawn to G, where it bisects the 95% vertical line. A horizontal line to H finally reveals a net fuel consumption of 5.6 million BTU/ton. If the exhaust gases had also contained CO, allowance would be made at point B by adding 0.5% of $CO_2$ for every percent of CO to redetermine an equivalent $CO_2$.

When excess air is used in combustion, $CO_2$ in the exit gases may be reduced and $O_2$ content increased — or incomplete combustion results with less $CO_2$ and formation of CO. Both situations dissipate heat and this is why the determination of equivalent $CO_2$ is important, because it reconstructs theoretically the amount of $CO_2$ that would be present if combustion was balanced and there was no surplus of air. Generally, the higher the $CO_2$ is in the exhaust gases, the higher the thermal efficiency.

FIG. 2 represents a typical Azbe kiln of the prior art, and consists of a brick-lined vertical kiln 1, provided with an oil burning chamber 3; air inlets 5; a hot air recycling system comprising hot air outlets 7, hot air recycling fans 9, 11 and recycled air inlets 13; a waste gas exhaust 15; a stone charging device 17 fed via a skip and bucket system 19; and a hydraulic draw feeder 21 for withdrawing calcined lime from the bottom of the kiln and feeding to a lime conveyor 23. Although this kiln is shown as being oil-fired, relatively minor modifications only are necessary to operate the kiln on gas, wood or coal. Wood, if avialable at reasonable cost, is in fact the ideal fuel in a kiln of this type because it produces a longer flame than other solid, liquid or gaseous fuels, enabling the heat to be released farther into the stone mass and creating a broader lower temperature burning zone. This maximizes kiln capacity and promotes more uniform calcination and soft burned lime. Considerable steam is generated from wood, more than any other fuel, contributing a tempering effect that lowers the flame temperature required for calcination. The resulting cooler temperature reduces the danger of overburning. Thus lime makers who are forced to use other fuels for reasons of economics or availability always strive to approximate the characteristics of wood burning. It is believed that of all of the factors affecting efficient limeburning, the slow controlled release of heat in the kiln is the most important, and it is to this end that much work including the present invention has been directed.

Figure 3A:
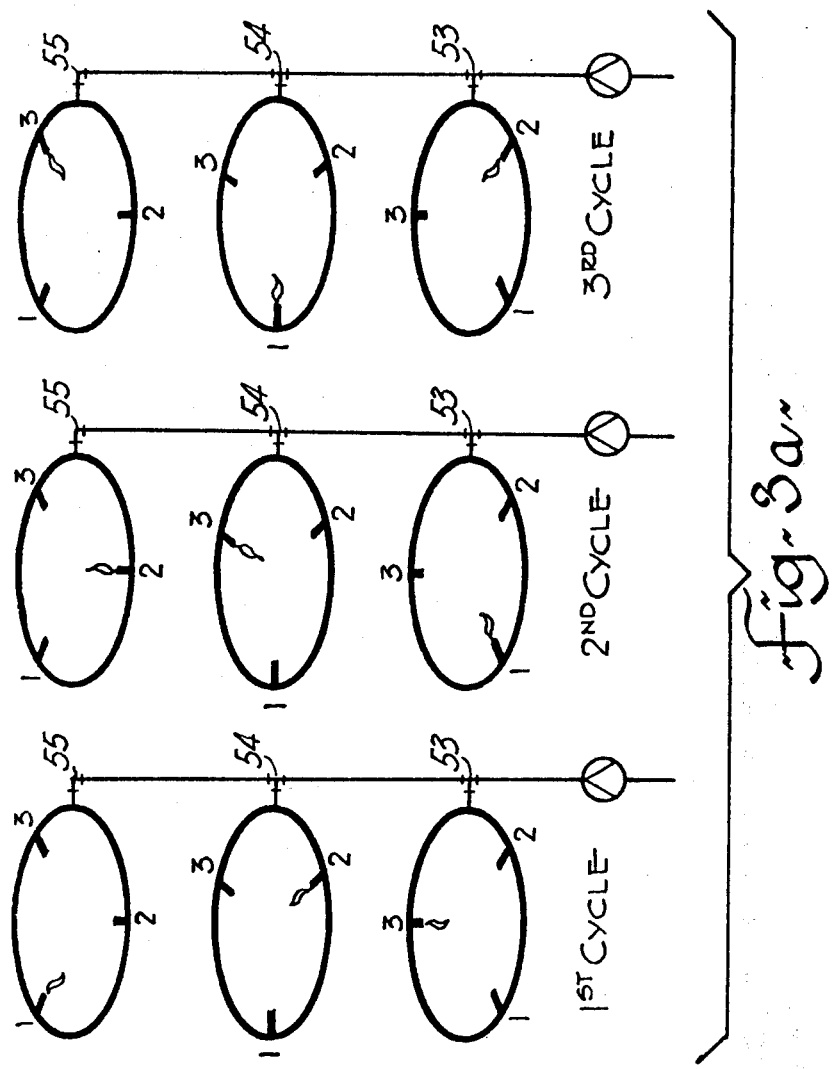
FIG. 3a is a schematic flow chart showing the full injection cycles in a kiln as shown in FIG. 3.
Figure 3:
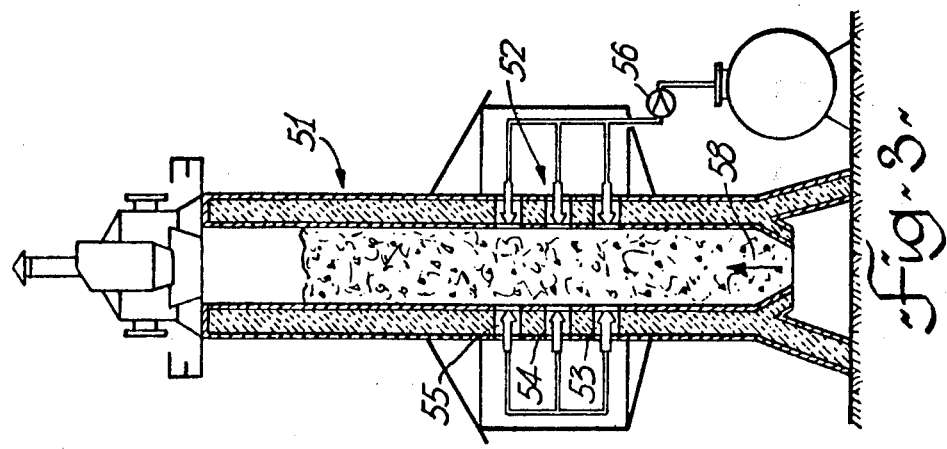
FIG. 3 is a schematic view of an Aton-Hansen Impulse Burner kiln.

Attempts to simulate the slow-burning characteristics of wood have included the use of impulse-firing in an Aton-Hansen vertical kiln such as that illustrated in FIG. 3 and described by Von R. Rittmann in Zement-Kalk-GIPS, No. 5, 1970. A vertical lime kiln 51, charged with limestone in the 2"-4" or greater size range, is provided with a plurality of burners or injection nozzles 52, 0.5 – 1.5 mm in diameter, arranged in two, three or four parallel horizontal planes (shown as 3 planes 53, 54 and 55 in FIG. 3). Conveniently, but not essentially, three burners are provided in each plane, arranged symmetrically around the circumference of the kiln but with the burners in each plane being circumferentially displaced from the burners in the other two planes, as shown in FIG. 3a. The supply of oil to individual burners is electronically controlled as by controller 56 so as to provide a pulse of oil to each burner in each plane in turn, as illustrated in FIG. 3a, so that, for example, in the first cycle fuel is provided at burners 3, 2 and 1 in levels 53, 54 and 55, respectively. In the second cycle, fuel is provided at burners 1, 3 and 2 in levels 53, 54 and 55, respectively, and in the third cycle fuel is provided at burners 2, 1 and 3 in levels 53, 54 and 55, respectively. The oil is vapourized in the burners and is mixed with combustion air 58 fed upwardly from below, so that it burns in a kidney-shaped burning zone in front of each burner for approximately one-third of each cycle. It is claimed that this system of impulse burning requires less than 1000 k cal per kg of lime and can produce 1.25 tons per sq. ft. of kiln diameter per day. The system is, however, limited to relatively large sized limestone because of penetration difficulties and the low pressures required to keep the burning zone adjacent the burners. Even with three planes of burners it has not been found possible to achieve the lamellar flow of fuel as described hereinafter with reference to the present invention, which has been found particularly successful in achieving high throughputs of lime with minimum heat input. The cycle time in the Aton-Hansen system is such that the individual pulses of fuel, normally oil, are relatively long in comparison to the complete cycle and at relatively low pressure.

Lamellar flow is a term used herein to describe a threestage cycle for fuel burning wherein, in the first stage there is an almost instantaneous injection of fuel (.02 to 0.2 seconds) at a relatively high pressure (in the range 2,000 to 15,900 psi and preferably 6,000 to 8,000 psi at the nozzle) through a nozzle of a plurality of nozzles spaced in a single horizontal plane around the circumference of the kiln, and used sequentially in a predetermined sequence, into the mass of hot lime in front of the injector in order to totally flood this area with fuel and in so doing exclude all combustion air from the area. In the second stage, after the short pulse of fuel, there is a relatively much longer period of time (0.1 to 0.5 seconds) before the next fuel pulse during which combustion air, under the differential pressure existing between the bottom and top of the kiln, moves upwardly and displaces the fuel zone above it. In the third stage, there is a gradual breakdown in the boundaries between the upwardly moving air and fuel zones so that combustion starts to take place and heat is gradually released at a point removed from the injection nozzle. The cycle is then repeated with the next nozzle in the sequence. It will, of course, be appreciated that rapid, pulsed fuel injection to a bed of incandescent limestone will, in effect, cause a series of minor explosions within the kiln, in a manner analagous to the firing of the cylinders in a conventional internal combustion engine, and that such explosions add impetus to the mixing action between the combustion gases, combustion air and the limestone. The shock waves thus generated aid in overcoming differing flow rates of gas through passages of different resistance within the kiln charge.

As is well known, lime exhibits a surface combustion effect whereby combustion air and fuel gas are apparently adsorbed onto the porous surface thereof and thus burns so that heat is absorbed directly without an apparent burning condition. Because the kiln is operated on a continuous basis, lime and limestone is constantly moving downwardly against the upwardly flowing gases, thereby causing intimate mixing of the fuel and air. This mixing is even further increased by the pulsing effect of fuel from different injectors injected at different instants in time which causes a horizontal reverse shift in the movement of combustion air and gas.

It will also be appreciated that the rate of burning is controlled by the timing and size of the fuel injections. A shorter time between pulses, smaller injections of fuel and increase in excess air all tend to produce a faster release of heat, depending upon other factors such as the size and type of limestone and specific kiln dimensions.

Figure 4:
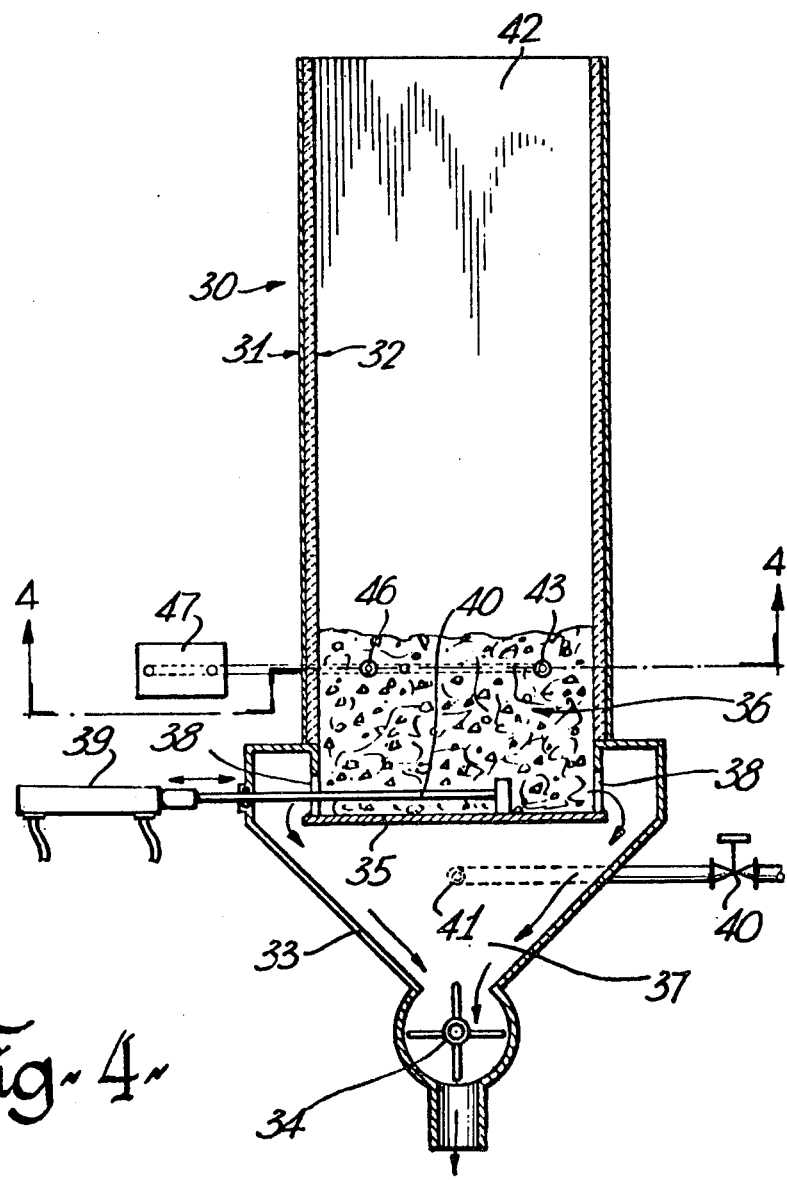
FIG. 4 is a vertical section through a simplified version of a kiln according to the present invention.

A kiln to achieve the lamellar flow pattern described hereinabove has been designed with an oil fuel injection system based upon a pump and fuel injector system of a conventional diesel engine, as shown schematically in FIGS. 4 and 5. In the first successful kiln of this construction a conventional 6-cylinder diesel engine system was employed, because of its ready availability, although only four of the six injectors were coupled to the kiln. It will be appreciated that the type and number of injectors is merely a matter of kiln design and choice and is in no way critical to the operation of a pulsed feed kiln of the present novel design.

Figure 5:
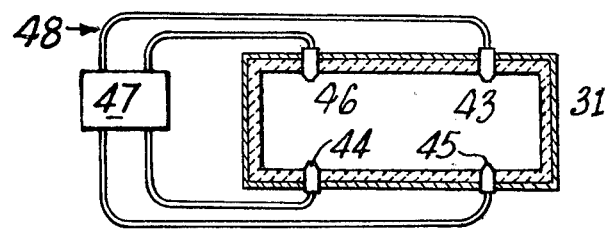
FIG. 5 is a plan view of a kiln according to the present invention taken along a line 4—4 in FIG. 3.

My novel furnace comprises a vertical shaft, shown generally at 30, having a rectangular cross-section, as shown in FIG. 5. The shaft 30 is provided with a steel shell 31 lined with basic refractory brick 32, such as MAGNECON. The shaft is supported in the vertical position by any convenient and conventional means (not shown) and is connected to a sheet steel tapered base member 33, which is slightly larger in external dimension than the shaft and which is provided with an airlock 34 through which burned lime may be discharged. A mild steel draw feeder plate 35 of slightly larger dimensions to those of the shaft is supported in a horizontal plane within the tapered base 33 and somewhat below the bottom of shaft 30, so as to provide a baffle for burned material 36 falling into the base cooling hopper 37, through peripheral space or gap 38. A hydraulic draw cylinder 39 powers a ram 40 which reciprocates across the surface of plate 35 to draw burned material over alternate peripheral edges of plate 35 and down into hopper 37 through gap 38. Limestone generally in the size range of 5/16 – ⅝inch, ⅝ – 1¼inches, 1¼ – 2½inches, 2½ – 5 inches with a size ratio 1:2 is fed to the top 42 of the shaft 30, via a conventional kiln charging mechanism (not shown), to form a permeable column supported by feeder plate 35. It will be appreciated that although limestone up to about 2½ inches is normally employed, material up to about 5 inches may also be treated, depending on kiln size and specific operating techniques. Combustion air is introduced through a valve 49 and inlet 41 in hopper 37 from an external air compressor (not shown), so as to give a positive pressure in the cooling hopper 37 of approximately 4½ inches $H_2O$. The combustion air passes upwardly through openings 38 and is preheated by the descending burned lime which is in turn cooled so that it is discharged from airlock 34 at approximately 100°–200° F. Air is introduced in sufficient quantity to support combustion and for maximum efficiency the oxygen content of the exhaust gases should be substantially zero. In any event it is preferred that the oxygen content should be less than about 5%, so that the amount of air required may be simply monitored by analysis of the exhaust gases.

Fuel oil is injected under a pressure of the order of 2000–15000psi and preferably 6000–8000psi into the charged stone column through conventional spring loaded fuel injectors 43, 44, 45 and 46, approximately 0.003 inch (.075 mm) in diameter in a pulsed sequence, is moved upwardly and then admixed with the continuously upwardly flowing preheated air. It then ignites and burns with a long flame. As previously indicated, the pulsed input of fuel to achieve lamellar flow lies at the heart of the present invention and may be achieved in a variety of ways known per se. For simplicity and convenience, it has been found that the fuel injection pump 47 and system 48 from a conventional diesel engine is ideal. In a conventional six-cylinder diesel engine the cylinders fire in the order 1 5 3 6 2 4 and in the present invention it has been found that operating at a simulated engine speed of about 200–1000 rpm (that is, each injector receives fuel 100–500 times per minute) lamellar flow of fuel and air through the shaft can be achieved. On the furnace shown in FIGS. 4 and 5, which is designed at a 5 ton/day furnace with a shaft cross-section of 1 × 2 feet and a shaft height of 8 feet, fuel injectors 43, 44, 45 and 46 correspond to cylinders 1, 5, 6 and 2, respectively. Fuel normally destined for cylinders 3 and 4 is not required and is merely recirculated to the fuel tank. Of course, it will be appreciated that on larger sized kilns, six to twelve or even more injectors may be required depending upon the cross-section of the kiln and the amount of fuel required to burn the charged stone.

Having described a kiln incorporating the features of the present invention, a particular kiln operation will now be described. A kiln having a shaft 8 ft. high and lined with 3 inches of basic refractory brick to provide an inside cross-section of 1 × 2 ft. was provided with a steel cooler section extending 8 inches below the refractory lining. Four fuel injectors were provided 12 inches above the base of the refractory and air was blown in through the cooler to provide an internal pressure of 4.25 inches $H_2O$. Stone containing 98–99% $CaCO_3$, from Shawinigan Mines, Bedford, P.Q., Canada, in the range +⅝–1¼ inches was charged to the top of the shaft. No. 6 fuel oil was injected through the injectors at the rate of 240 injections per injector per minute and ignited. When operation has stabilized the following temperature readings were established:

TABLE 1

| Position | Temp. | |
|---|---|---|
| 1' above injectors | (1010° C) | 1850° F |
| 46" above injectors | (843° C) | 1550° F |
| 54" above injectors | (788° C) | 1450° F |
| exhaust gas | (121° C) | 250° F. |

TABLE 1-continued

| Position | Temp. | |
|---|---|---|
| lime discharge | (66° C) | 150° F |

Burned lime was continuously withdrawn from the kiln, operating the draw feeder at a rate of 1 min 40 secs for a full return stroke and it was found that 5 tons of CaO per day (24 hours) was produced at a fuel consumption of 3.46 U.S. gals/hour. The fuel efficiency, assuming the calorific value of No. 6 fuel oil to be 155000 BTU/U.S. gal, is $3.46 \times 155000 \times 24/5 = 2,574,240$ BTU/ton for 100% CaO. It was found that the product was about 90% CaO so that the fuel efficiency was in fact 2,860,266 BTU/ton.

Waste gas analyses were taken every hour over a 24-hour period and are tabulated below.

TABLE 2

| Time | Fuel Type | RPM (Injections/injector/min) | Air " Hg | $CO_2$ | Oxygen | CO |
|---|---|---|---|---|---|---|
| 2.00 pm | | | | 20.1 | 5 | 0 |
| 3.00 | | | | 25 | 0 | 1 |
| 4.00 | | | | 27 | 0 | 2 |
| 5.00 | No. 2 Oil | 240 | 2 ¼" | 31 | 2 | 0 |
| 6.00 | 2 | 240 | 2 ¼" | 30 | 1 | 0 |
| 7.00 | 2 | 240 | 2 ¼" | 30 | 2 | 0 |
| 8.00 | 2 | 240 | 2" | 29 | 0 | 2 |
| 10.30 | 2 | 240 | 3 ½" | 30 | 3 | 0 |
| 1.00 am | 2 | 240 | 3 ¾" | 32 | 5 | 0 |
| 2.00 | 2 | 240 | 3 ¾" | 33 | 4 | 0 |
| 3.00 | 2 | 240 | 4" | 32 | 4 | 0 |
| 4.00 | 2 | 240 | 4" | 33 | 5 | 0 |
| 5.00 | 2 | 240 | 3 ¾" | 34 | 4 | 0 |
| 6.00 | 2 | 240 | 4 ¼" | 33 | 6 | 0 |
| 7.00 | 2 | 240 | 4 ¼" | 32 | 5 | 0 |
| 7.30 | No. 6 Oil | 240 | 4 ¼" | 33 | 4 | 0 |
| 8.30 | 6 | 240 | 4¼" | 34 | 6 | 0 |
| 9.15 | 6 | 240 | 4 ¼" | 33 | 5 | 0 |
| 10.30 | 6 | 220 | 4 ¼" | 30 | 2 | 0 |
| 10.45 | 6 | 220 | 4 ¼" | 32 | 5 | 0 |
| 1.00 pm | 6 | 220 | 4" | 34 | 4 | 0 |

The waste gas analyses offer a useful check upon the thermal efficiency calculated from the fuel consumption figures, when inserted into the graph shown in FIG. 1. Let us take the analysis for 7.30 a.m., showing 33% $CO_2$, 4% $O_2$ and 0% CO, using No. 6 oil as fuel and insert these figures into FIG. 1. At 4% $O_2$ enter at A' and proceeding to B', C', D', E', F', G' and H' by the process described hereinbefore for calculation of heat efficiency, it is found that for 90% CaO material the efficiency (H') is approximately 3.25 million BTU/ton lime produced, which represents a remarkable correlation with the oil consumption calculations and a remarkable improvement over the efficiency of kilns of the prior art.

While the present invention has been described with particular reference to burning of lime using fuel oil as the combustion fuel, it will be appreciated by those skilled in the art that many modifications of the present kiln are possible while still employing the novel features thereof and that the heating principles of the invention may be employed for treatment of many different materials. It is suggested, for example, that the kiln may be used for the thermal decomposition of municipal wastes or garbage. It will also be appreciated that the combustion fuel may also be natural gas or other gaseous fuel or even a solid fuel such as pulverized coal or coke which may be carried in a fluidizing medium such as another gas or fluid.

What is claimed is:

1. A process for the continuous production of calcined lime from limestone in a vertical kiln in which fuel is supplied through a plurality of injectors circumferentially spaced around the kiln in a single horizontal plane spaced from the lower end of the kiln and combustion air is supplied to said kiln, from a level below said injectors, counter current to the flow of limestone, comprising:
   a. charging limestone ranging in size up to about five inches to the top of said kiln for downward movement therethrough;
   b. continuously blowing air upwardly through said kiln in an amount sufficient to support combustion, and injecting fuel at a pressure in the range between 200 and 15000 psi through each of said injectors in a predetermined sequence at a rate between 100 and 500 injections per injector per minute, each of said injections occurring in a time period between 0.02 and 0.2 seconds, with a time period of 0.1 to 0.5 seconds between injections, the time period between injections being longer than the time of the injections thereby establishing lamellar flow of fuel and air in said kiln; and
   c. withdrawing calcined lime at the lower end of said kiln.

2. A process as claimed in claim 1 wherein said fuel is selected from the group consisting of fuel oil, natural gas, manufactured gas, and pulverized coal.

3. A process as claimed in claim 1 wherein said fuel is injected at a pressure in the range between 6000 and 8000 psi.

* * * * *

UNITED STATES PATENT AND TRADEMARK OFFICE
CERTIFICATE OF CORRECTION

PATENT NO. : 4,031,183
DATED : June 21, 1977
INVENTOR(S) : Terence Arthur Rourke It is certified that error appears in the above-identified patent and that said Letters Patent are hereby corrected as shown below:

Column 8, lines 42 and 43 should read "and injecting fuel at a pressure in the range between 2000 and 15000 psi through each of said"

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*